Sept. 4, 1956 W. L. SHELTON 2,761,303
SOIL EXTRACTION MEANS FOR CLOTHES WASHERS AND THE LIKE
Filed Nov. 13, 1953 2 Sheets-Sheet 1

INVENTOR.
WINSTON L. SHELTON
BY
HIS ATTORNEY

Sept. 4, 1956 W. L. SHELTON 2,761,303
SOIL EXTRACTION MEANS FOR CLOTHES WASHERS AND THE LIKE
Filed Nov. 13, 1953 2 Sheets-Sheet 2

INVENTOR.
WINSTON L. SHELTON
BY
HIS ATTORNEY

United States Patent Office 2,761,303
Patented Sept. 4, 1956

2,761,303

SOIL EXTRACTION MEANS FOR CLOTHES WASHERS AND THE LIKE

Winston L. Shelton, Louisville, Ky., assignor to General Electric Company, a corporation of New York Application November 13, 1953, Serial No. 391,857

6 Claims. (Cl. 68—23)

This invention relates to clothes washing machines, liquid extractors and the like, and more particularly to means in such machines for removing insoluble solid soil particles.

A primary object of this invention is to provide an arrangement in a washing container of a clothes washing machine to remove insoluble particles of soil from the clothes and the washing liquid, and to prevent redisposition of such particles.

Another object of my invention is to provide a soil trap for insoluble particles, which is readily removed for cleaning.

A further object of my invention is to arrange such a soil trap under the clothes washing agitator, thereby to provide more complete removal of insoluble particles, such as sand and dirt.

It is also an object of my invention to construct such soil removal means in a manner providing economical manufacturing cost and installation and which can be completely disassembled from the machine for ease of cleaning.

In carrying out my invention in one form thereof, the vertical axis clothes basket of a washing machine is provided with a recessed area in the bottom underneath the agitator. A soil trap plate overlies this recessed area to define a soil trap chamber, this plate having apertures spaced inwardly from its periphery, through which particles of sand, dirt, and other insoluble material may enter into the trap chamber. Thereafter, tendency of such particles to move outwardly under the influence of the agitator action and basket rotation prevents redisposition within the basket. This invention further features the use of resilient sealing members carried by the soil trap plate to close drain holes in the bottom of the basket. Hence, when the trap plate is removed for cleaning, the insoluble particles can be flushed through these holes for ultimate disposition outside of the machine. Alternately, this invention is featured by a removable soil trap assembly including walls defining the soil trap chamber, whereby the entire soil trap assembly may be removed along with the insoluble soil particles.

Figure 1:
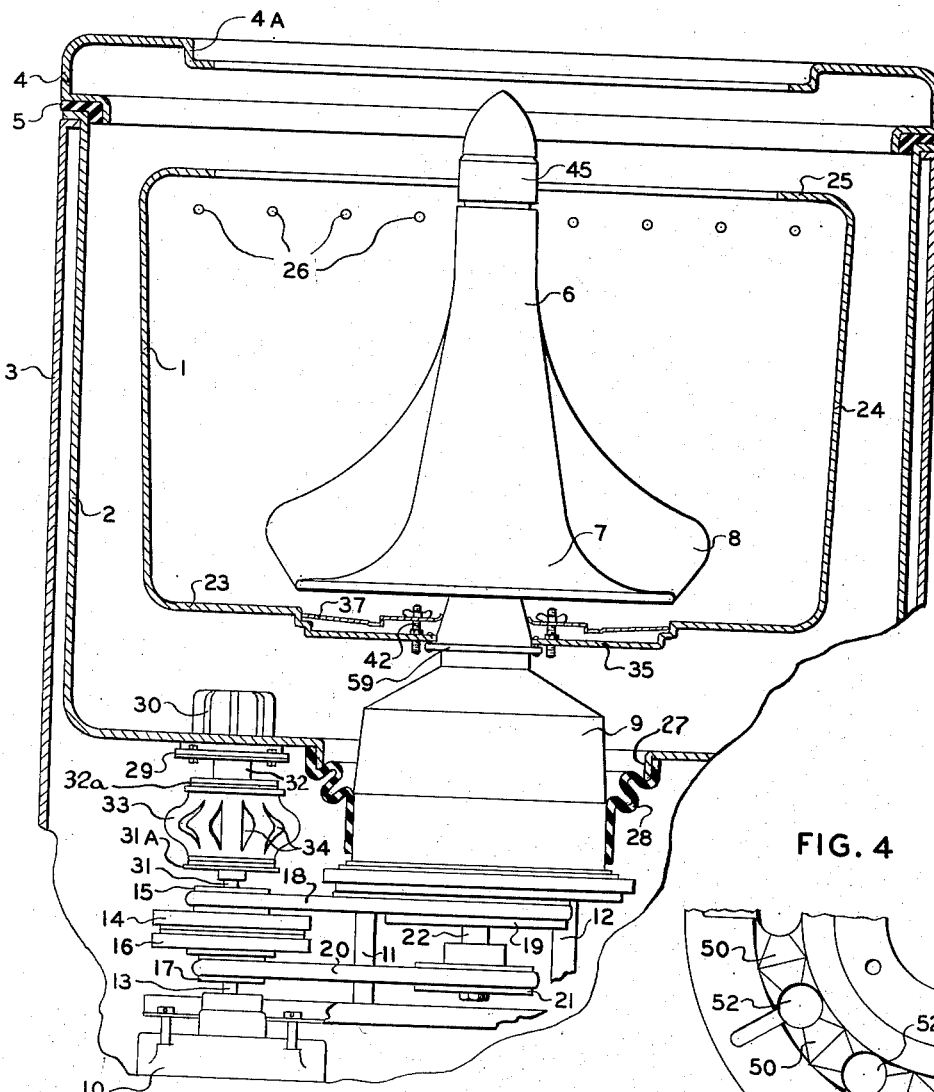
Figure 4:
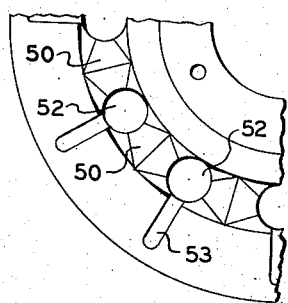
Figure 5:
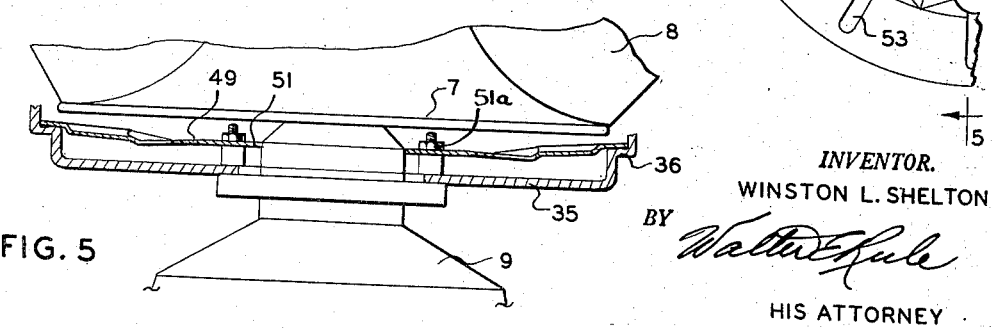
Figure 2:
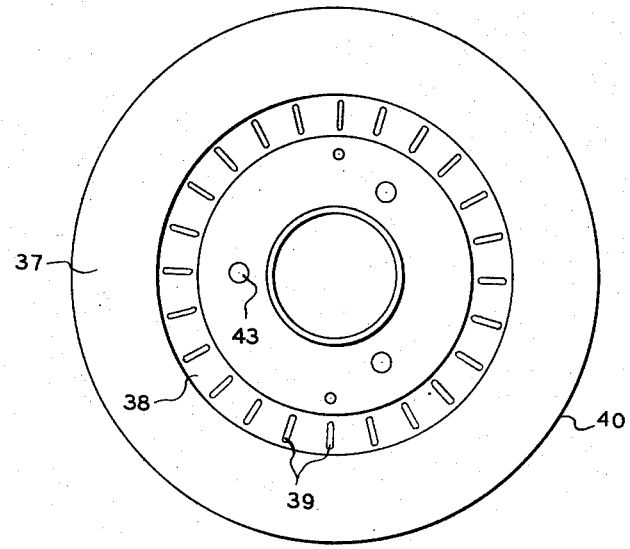
Figure 3:
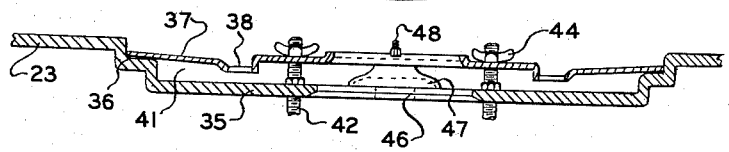
Figure 6:
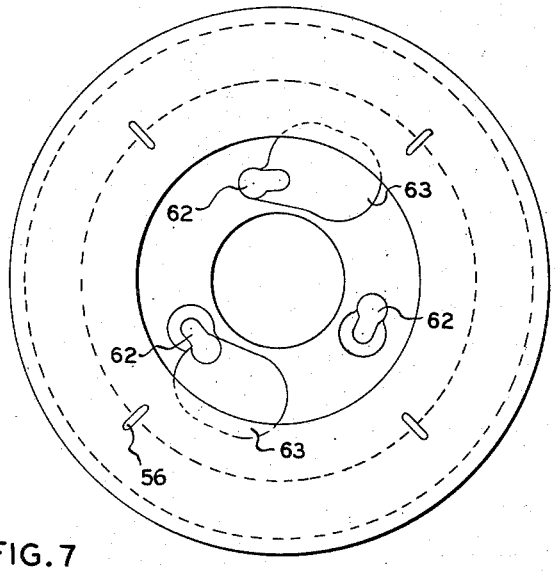
Figure 7:
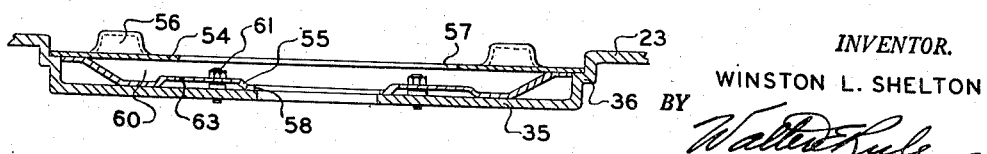

The features of this invention believed to be novel are set forth with particularity in the appended claims. The invention itself, however, both as to its organization and method of operation, together with further objects and advantages thereof will best be understood by reference to the following description taken in connection with the accompanying drawings, in which Fig. 1 is a partial cross-sectional elevation through a clothes washing machine embodying this invention; Fig. 2 is an enlarged plan view of a component; Fig. 3 is an enlarged cross-sectional view of a portion of the machine illustrated by Fig. 1; Fig. 4 is a plan view of a modified form of the device illustrated by Fig. 2; Fig. 5 is a partial cross-sectional view, similar to Fig. 1, but illustrating the modification of Fig. 4; Fig. 6 is an enlarged plan view illustrating another modification of this invention; and Fig. 7 is a partial cross-sectional elevation of the device illustrated by Fig. 6, as installed in a washing machine.

In the exemplary embodiment disclosed herein, my invention is depicted in an automatic clothes washing machine of the type having a basket 1 rotatable on a substantially vertical axis. This basket is enclosed within a surrounding tub 2, which in turn is supported and enclosed by an outer cabinet or casing 3. In a conventional manner, a top cover 4 rests on the cabinet and tub structure with a flexible sealing gasket 5 therebetween. Cover 4 includes a suitable access opening 4a therein for loading and unloading the machine. Within basket 1 is a clothes washing means, here shown in the form of an agitator 6 having a downwardly and outwardly flared skirt 7 with a plurality of radial vanes 8 projecting upwardly therefrom. Such agitator constructions are, of course, well known in the art.

Basket 1 and agitator 6 are driven and rotatably supported by a gear case assembly 9. Gear case 9 also supports the driving power source, shown as an electric motor 10. This support may be accomplished in any convenient manner, for example by brackets 11 and 12. The motor, through its output shaft 13, drives a bi-directional clutch assembly having an upper half 14 rotating drive pulley 15 and a lower half 16 providing a drive for pulley 17. Drive pulley 15 through flexible belt 18 rotates a driven pulley 19 to furnish the motive power for rotating basket 1 at a substantial speed for centrifugal extraction. Drive pulley 17 through flexible belt 20 rotates driven pulley 21, which furnishes the input through a shaft 22 for oscillation of agitator 6.

The transmission, clutches, and drive mechanism are illustrated schematically herein, and only to the extent necessary to understand this invention. For further details of this construction, reference is made to Patent 2,639,618, issued to J. W. McNairy, May 26, 1953, and assigned to the General Electric Company, assignee of this application.

As illustrated by Fig. 1, the basket 1 is of the type having a substantially imperforate bottom wall 23 and upwardly and outwardly flared side wall 24, terminating at its upper edge in an inwardly turned flange 25 acting as a barrier to prevent clothes contained within the basket from being floated or projected from the basket during the washing operation. Adjacent the upper edge of basket 1 and at its maximum diameter are a plurality of apertures 26, through which washing liquid may be thrown out of the basket into outer tube 2. Tub 2 must, of course, be capable of containing a substantial quantity of washing liquid. A central flanged aperture 27 is provided in tub 2, through which gear case 9 extends. Connected to this flange in a liquid-tight manner is a flexible boot 28. Boot 28 is also connected in a liquid-tight manner to the outer surface of gear case 9. With the construction as shown, limited gyration of the assembly consisting of basket, gear case, and drive motor is permitted with respect to tub 2 and outer cabinet 3.

To dispose of washing liquid discharged into tub 2, a liquid pump 29 is employed with an inlet strainer 30 in the tub leading into the pump intake. Liquid pumped from tub 2 is conducted to the sanitary sewer system by any suitable means (not shown). Pump 29 is driven from motor 10 by means of a shaft extension 31 having keyed thereto a driving plate 31a. A corresponding pump driving plate 32a is secured to pump shaft 32. Normally these two driving plates are aligned and in face to face relationship. To provide the necessary flexible driving connection between motor 10, which is in the so-called moving system, and the pump 29 which is in the stationary system, I employ a generally cylindrical member 33 of flexible material having a plurality of axially extending apertures 34 therein.

In operation of machines of this type, the materials to be washed, a charge of washing liquid, and a suitable detergent are placed within basket 1. When motor 10 is energized and rotates in a first direction, clutch half 16 is effective to rotate drive pulley 17, thereby to rotate the agitator shaft 22 by means of flexible belt 20. Agitator 6 is thus driven with an oscillatory motion, while basket 1 remains substantially stationary. By this operation, soil is removed from the materials being washed in the well-understood manner. Some of the soil from the clothes, of course, combines and reacts with the detergent, resulting in products which float on the surface of the water. Similarly, lint particles from the clothing itself have a tendency to float or rise toward the surface of the washing liquid. However, other insoluble soils such as dirt, sand, and the like, are heavier than the washing liquid, and hence tend to settle to the bottom of the machine. In practice, it is found that these heavier particles follow the downwardly and inwardly tapered walls of the wash basket and eventually lodge themselves underneath the agitator skirt in the area of minimum fluid velocity.

Subsequently, when basket 1 is rotated at high speed, accomplished by reversing the direction of rotation of motor 10, driving upper clutch half 14, belt 18, and pulley 19, the washing liquid contained within the tub under the influence of the centrifugal force is thrown outwardly through apertures 26 into the outer tub. Soil particles which are lighter than the washing liquid rise with the liquid and hence are thrown outwardly through apertures 26. However, the insoluble soil particles which are heavier than the washing liquid tend to remain in the bottom of basket 1. Hence, if the heavy soil particles are not removed from the basket, when the machine is refilled with rinsing liquid, and the agitator is again operated, such particles are redeposited on the clean clothes. Such particles may in fact remain in the basket indefinitely unless positively removed.

In accordance with this invention, I provide means for positive removal of the insoluble soil particles that settle to the bottom of basket 1. In a preferred arrangement shown by Figs. 1-3 bottom wall 23 of the tub, in its central area, is stepped downwardly to provide a recessed or depressed area 35, of substantially the same diameter as the maximum diameter of skirt 7 of the agitator. Preferably, although not necessarily, two steps are employed in the transition from bottom wall 23 of the basket to wall 35 of the repressed area. The intermediate step 36, of generally annular configuration, forms a shoulder to receive the peripheral edge of a soil extraction plate 37.

Referring now to Figs. 2 and 3, illustrating the soil extraction plate in greater detail, it is seen that it slopes inwardly and downwardly from its peripheral edge to an annular groove 38 with a plurality of apertures 39 through the plate in the area of the groove, through which the particles of solid soil pass. These apertures 39 are spaced a substantial distance inwardly from the outer peripheral edge 40 of the extractor plate, thereby to define with bottom wall 35 a soil trap chamber 41 of appreciable volume, and which is closed off from the clothes basket with the exception of soil entrance apertures 39. Thus, with this arrangement, during the washing operation, the particles of sand, dirt and the like extracted from the clothes settle downwardly and eventually traverse bottom wall 23 of the basket onto the soil extraction plate 37. Because of the inclination of this plate, as clearly shown by Fig. 3, the particles continue their motion inwardly to the annular groove 38 from whence they may fall through openings 39 into the soil trap.

Soil trap plate 37 may be secured to tub 1 in any suitable manner, although preferably it is attached in such a manner as to permit ready removal for cleaning purposes. Thus, as shown by Figs. 1 and 3, a plurality of threaded studs 42 are secured in equiangularly spaced relation to wall 35 of the basket. These studs 42 extend upwardly through openings 43 in the soil extraction plate and each receives a wing nut 44, by which the soil extraction plate can be clamped in position.

In accordance with conventional practice, agitator 6 is held in the desired position within basket 1 by means such as an acorn hand nut 45. By removal of acorn nut 45, the entire agitator can be removed from the center post. This provides immediate access to wing nuts 44 for removal of soil extraction plate 37.

To facilitate removal of the solid soil particles from the recessed area of the basket, one or more enlarged apertures 46 are provided through bottom wall 35 opening into tube 2. Thus, with soil extractor plate 37 removed, water flushed into basket 1 flows down the side walls thereof, washing the sand and dirt particles downwardly into the recessed area 35, from which it flows through apertures 46 into tub 2.

During a washing or rinsing operation it is essential that the liquid be retained within basket 1. Holes 46 must therefore be sealed off. For this purpose, in accordance with the embodiment of Figs. 1 through 3, an inverted cup-shaped member 47 of resilient material is secured to the underside of extractor plate 37 by any suitable means, such as a threaded stud 48. The inverted cup-shaped member is so positioned on the underside of the extractor plate that when the plate is in position, as shown by Figs. 1 and 3, this member seals its corresponding opening 46. However, whenever activator 6 is removed, and the soil extractor plate is removed, opening 46 is uncovered permitting the solid soil particles to be washed through aperture 46 into tub 2 from whence such particles may be pumped to the drain with the waste liquid by means of pump 29. It is to be understood that such apertures are not essential to the operation of the soil trap in accordance with this invention, but their use does increase the convenience.

In the embodiment illustrated by Figs. 4 and 5, a modified form of a soil extractor plate is illustrated. In accordance with this embodiment, basket 1 is similarly formed with the recessed bottom area 35 and the stepped shoulder portion 36. However, the soil extractor plate indicated generally at 49 is in the form of a snap action disk, by virtue of a coining process providing pre-stressed areas 50, so that the outer periphery of the disk snaps between a raised position and the sealed position shown. As shown by Fig. 5, disk 49 includes a central area 51 secured to the bottom wall 35 of the soil trap chamber by means such as nuts 51a threaded onto shouldered studs. It is contemplated that this portion 51 of plate 49 is to be securely and permanently fastened to the basket. By virtue of coined areas 50, plate 49 has an "oil-can" effect providing a sealed position with the outer periphery of the plate in contact with shoulder 36, and an open position in which the outer periphery of the disk is in a raised position with respect to shoulder 36. A plurality of openings 52 are provided in the plate through which particles of solid soil fall into the soil trap chamber. Additionally, a channel 53 may be associated with each aperture 52 to guide the soil particles more rapidly into the openings and hence into the soil trap chamber. Thus in accordance with this embodiment, when the soil trap has a substantial quantity of material therein, the operator removes the agitator as previously described, and then grasps disk 49 by inserting fingers through apertures 52 to snap the outer edge of the disk to the upper position. The machine may then be set for centrifugal extraction, without clothes, and cleaned by conducting water into the central portion of the basket. By this means, the solid soil particles may be thrown outwardly along with the water through apertures 26 in the upper wall of basket 1.

In Figs. 6 and 7 I have shown another embodiment of this invention, wherein the soil trap is fabricated as a unitary element and arranged so that upon removal of the trap assembly the soil is removed with the trap. Again, basket 1 is formed with a depressed central area defined by the bottom wall 35 in stepped relation with bottom wall 23 of the basket to define an intermediate shoulder 36 upon which the outer periphery of the soil extractor assembly rests. In accordance with this embodiment, however, the soil extractor assembly is made up in the form of two plates 54 and 55 secured together at their peripheries. Top plate 54 may be provided with a plurality of upwardly extending lugs 56 to facilitate handling. Plate 54 is also provided with a central opening 57 of larger diameter and area than a similar opening 58 in bottom plate 55. Opening 58 along with the corresponding opening in the basket are to receive hub 59 as illustrated by Fig. 1. Lower plate 55 in conjunction with upper plate 54 define the soil extraction chamber 60 to receive solid soil particles which settle along the bottom wall of the basket and eventually accumulate under the skirt of the agitator.

This entire soil extractor assembly as shown by Figs. 6 and 7 is secured to the tub by means of shouldered studs 61 positioned in bottom wall 35, engageable in keyhole slots 62 formed in plate 55 of the soil extractor. The area adjacent each keyhole slot is bowed upwardly as indicated at 63 as a means of securely retaining the soil extractor plate in position. Thus, to remove this soil extractor assembly from the machine, the agitator is removed as previously described, whereupon the operator may grasp upstanding lugs 56 to rotate the plate assembly in a clockwise direction until the enlarged heads of the shouldered studs 61 pass through the enlarged area of corresponding keyhole slots. As shown the soil extraction chamber 60 is integral with the upper and lower plates 54 and 55. Therefore, when this soil extractor assembly is removed, all of the solid soil particles are removed at the same time since they are contained within chamber 60. This assembly may then be independently rinsed out under a convenient water source. To return the assembly to its position in the bottom of the basket, the device is pressed into position and rotated in a counter clockwise direction to lock the small end of each keyhole slot under the head of a respective shouldered stud.

While the present invention has been described by reference to particular embodiments thereof, it is to be understood that numerous modifications may be made by those skilled in the art without actually departing from the invention. I, therefore, aim in the appended claims to cover all such equivalent variations as come within the true spirit and scope of the invention.

What I claim as new and desire to secure by Letters Patent of the United States is:

1. In a clothes washer, a top opening container for material to be washed and a charge of washing liquid, a depressed area in the bottom of said container, a drain opening in said container within said depressed area, agitation means within said container having a skirt thereon extending outwardly over said depressed area, a soil trap plate secured to the bottom wall of said container under said agitation means and forming in conjunction with said depressed area a soil trap chamber, means removably securing said soil trap plate to said container under said agitation means, and means carried by said soil trap plate closing said drain opening when said plate is in position.

2. In a clothes washing machine or the like, a top opening basket to receive material to be washed along with a charge of washing liquid, a depressed area in the bottom wall of said basket, means defining a drain opening in the bottom wall of said basket within said depressed area, agitation means within said basket, a soil trap plate secured to the bottom wall of said basket and forming in conjunction with said depressed area a soil trap chamber, means removably securing said soil trap plate to said container, and a resilient cup-shaped member carried by said soil trap plate closing said drain opening when said plate is in position.

3. In a clothes washing machine, a clothes basket adapted to contain material to be washed with a washing liquid, said basket being rotatable on a substantially vertical axis for centrifugal extraction, means defining a generally circular recessed area in the bottom of said basket, the boundaries of which define a shoulder, agitation means within said basket, a removable cover plate extending over said recessed area and attached to the bottom wall of said basket to define in conjunction with said basket a soil receiving chamber, the peripheral edge of said cover plate sealing with said shoulder, and means defining a plurality of apertures through said cover plate spaced inwardly from the periphery thereof through which solid soil particles enter said chamber during washing, said cover plate being otherwise imperforate to confine soil particles within said chamber during extraction.

4. In a clothes washing and extracting machine and the like, a clothes basket adapted to contain material to be washed with a washing liquid and which is rotatable on a substantially vertical axis for centrifugal extraction, means defining a recessed area of generally annular configuration in the bottom of said basket, the boundaries of which define a stepped shoulder, a soil trap member removably secured to said basket with the periphery thereof in contact with said stepped shoulder and cooperating with said recessed area to define a soil confining chamber, means removably securing said soil trap member within said basket, and means defining soil inlet apertures in said trap member spaced inwardly from its periphery, whereby soil enters said chamber during washing and remains confined therein during extraction.

5. In a clothes washer, a centrifugal extractor, or the like, a rotatable clothes basket having a bottom wall and upstanding side walls, said bottom wall having a downwardly stepped shoulder defining a recessed area, agitation means for washing articles in said basket, a cover plate cooperable with said stepped shoulder to define in conjunction with said basket a soil trap chamber, said cover plate having a plurality of apertures therein spaced inwardly from the periphery and being otherwise imperforate to permit entry of solid soil particles into said trap chamber during washing and to restrain outward movement thereof during rotation, and means securing said plate in position within said basket and permitting quickly detachable engagement of said plate with said shoulder, whereby said trap chamber may be opened for cleaning.

6. In a clothes washer and extractor, a clothes container having a top loading opening and substantially imperforate bottom and side walls, means for rotating said container for extraction, means defining a downwardly stepped area in the bottom wall of said basket for washing, agitation means within said basket, an upper soil trap plate sealing with said basket bottom wall and overlying said downwardly stepped area, a lower soil trap plate peripherally secured to said upper plate and defining therewith a trap chamber, the outer portions of said plates being imperforate whereby solid soil particles enter said trap chamber inwardly of the periphery during agitation and are retained therein during extraction, and means removably securing said plates to said basket bottom wall.

References Cited in the file of this patent

UNITED STATES PATENTS

| | | |
|---|---|---|
| Re. 23,626 | Castner | Mar. 10, 1953 |
| 1,597,395 | Snater | Aug. 24, 1926 |
| 1,971,588 | Stoddard et al. | Aug. 8, 1934 |
| 2,034,244 | Mikulasek | Mar. 17, 1936 |
| 2,218,276 | Woodin | Oct. 15, 1940 |
| 2,605,628 | Smith | Aug. 5, 1952 |